United States Patent
Yoshie et al.

(10) Patent No.: US 7,513,512 B2
(45) Date of Patent: Apr. 7, 2009

(54) STROLLER

(75) Inventors: Toshiro Yoshie, Tokyo-To (JP); Yutaka Ukitsu, Tokyo-To (JP)

(73) Assignee: Combi Corporation, Tokyo-To (JP)

( * ) Notice: Subject to any disclaimer, the term of this patent is extended or adjusted under 35 U.S.C. 154(b) by 659 days.

(21) Appl. No.: 11/290,566

(22) Filed: Dec. 1, 2005

(65) Prior Publication Data

US 2006/0119079 A1 Jun. 8, 2006

(30) Foreign Application Priority Data

Dec. 2, 2004 (JP) .............................. 2004-349784

(51) Int. Cl.
*B62B 7/14* (2006.01)

(52) U.S. Cl. .................... 280/47.38; 280/643; 280/650; 280/658

(58) Field of Classification Search .................. 280/30, 280/31, 643, 648, 650, 642, 644, 647, 657, 280/658, 47.41, 47.38
See application file for complete search history.

(56) References Cited

U.S. PATENT DOCUMENTS

| | | | |
|---|---|---|---|
| 5,676,386 A | | 10/1997 | Huang et al. |
| 5,794,951 A | * | 8/1998 | Corley et al. .................. 280/30 |
| 6,398,233 B1 | | 6/2002 | Liang et al. |
| 6,513,827 B1 | * | 2/2003 | Barenbrug .................. 280/648 |
| 6,908,100 B2 | * | 6/2005 | Kassai et al. ................. 280/642 |
| 7,017,921 B2 | * | 3/2006 | Eros ......................... 280/47.38 |
| 7,370,913 B2 | * | 5/2008 | Takamizu et al. ...... 297/256.16 |
| 2002/0056973 A1 | | 5/2002 | Yang et al. |
| 2004/0094922 A1 | | 5/2004 | Eros |
| 2004/0124611 A1 | * | 7/2004 | Gong et al. .................. 280/642 |

FOREIGN PATENT DOCUMENTS

JP 2002-205586 A 7/2002

* cited by examiner

*Primary Examiner*—Christopher P Ellis
*Assistant Examiner*—John D Walters
(74) *Attorney, Agent, or Firm*—Birch, Stewart, Kolasch & Birch, LLP

(57) ABSTRACT

A stroller 10 includes a body structure 10*a* and a child car set 40 capable of detachably mounted on the body structure 10*a*. The body structure 10*a* has a handle 15 having a pair of straight parts 15*a* and a shape resembling the inverted letter U. Armrest bars 16 have base parts respectively connected to the straight parts 15*a* of the handle 15. Connecting members 17 are attached respectively to front end parts of the armrest bars 16. A support frame 28 for supporting the child car set 40 is extended between the connecting members 17. End caps 29 are detachably put on opposite end parts of the support frame 28, respectively. Brackets 32 for supporting front side parts 40*a* of the child car set 40 thereon are provided to the straight parts 15*a* of the handle 15. Each of the brackets 32 has at least two steps 32*a* and 32*a* formed respectively at different levels.

7 Claims, 4 Drawing Sheets

STROLLER

TECHNICAL FIELD

The present invention relates to a stroller capable of being detachably provided with a child car set to be attached to a seat of a vehicle.

BACKGROUND ART

Generally, a child car set attached to the seat of a passenger car is used for carrying a baby of, for example, an age below one year in the passenger car. A stroller proposed in Patent document 1 can carry a child car set. A child car set attached to the seat of a passenger car holds a baby seated thereon until the passenger car arrives at a destination. Then, the child car set holding the baby is removed from the seat of the passenger car and is used as a seat for the stroller proposed in Patent document 1 to facilitate carrying around the baby at the destination.

Patent document 1: JP 2002-205586 A

Incidentally, such a stroller capable of being detachably provided with a child car set is provided with a child car set support frame extended between right and left armrests included in a body structure of the stroller. The child car set is fixedly mounted on the stroller with the child car set support frame engaged in a groove formed in the bottom surface of a rear part of the child car set.

Different child car sets manufactured by different manufacturers have different dimensions, respectively. Therefore, child car sets having dimensions not conforming to the size of the body structure of the stroller cannot be fixedly mounted on the stroller. The child car set support frame needs to be replaced with another one or needs to be turned for the adjustment of dimensions and angular position thereof or the stroller is able to support only limited types of child car sets.

DISCLOSURE OF THE INVENTION

The present invention has been made in view of the foregoing problems and it is therefore an object of the present invention to provide a stroller capable of stably supporting any one of child car sets respectively having different shapes and sizes in a proper angular position.

The present invention provides a stroller comprising: a body structure; and a child car set having an engagement part and opposite front side parts and capable of detachably mounted on the body structure; wherein the body structure has a handle having a pair of straight parts and a shape resembling the inverted letter U, armrest bars having base end parts respectively connected to the straight parts, connecting members respectively attached to front end parts of the armrest bars, and a support frame having opposite ends respectively connected to the connecting members and capable of engaging with the engagement part of the child car seat, and end caps detachably put on or removed from opposite end parts of the support frame, respectively, depending on the shape of the child car seat.

In the stroller according to the present invention, brackets for supporting the front side parts of the child car set thereon are attached to the straight parts of the handle.

In the stroller according to the present invention, each of the brackets has at least two steps formed respectively at different levels.

In the stroller according to the present invention, the support frame is connected to the pair of connecting members through L-shaped support frame holding members, respectively.

In the stroller according to the present invention, the end caps are able to slide along the support frame, the end caps have connecting protrusions, respectively, and the L-shaped support frame holding members are provided with recesses in which the connecting protrusions of the end caps are engaged, respectively.

In the stroller according to the present invention, the connecting protrusion of each of the end caps has a guide part that slides on the support frame, and a catching part on the outer side of the guide part.

In the stroller according to the present invention, a pair of hinges are incorporated into a middle part of the support frame, and the support frame is bent at the pair of hinges to enable the body structure to be folded in three.

According to the present invention, the end caps for width adjustment are detachably attached to the opposite end parts of the support frame, and the support brackets, for supporting the opposite front side parts of the child car set, each having at least the two steps formed respectively at different levels are fixed to the straight parts of the handle, respectively. Thus different types of child car sets can be stably supported on the body structure of the stroller in a proper angular position.

BEST MODE FOR CARRYING OUT THE INVENTION

Figure 1:
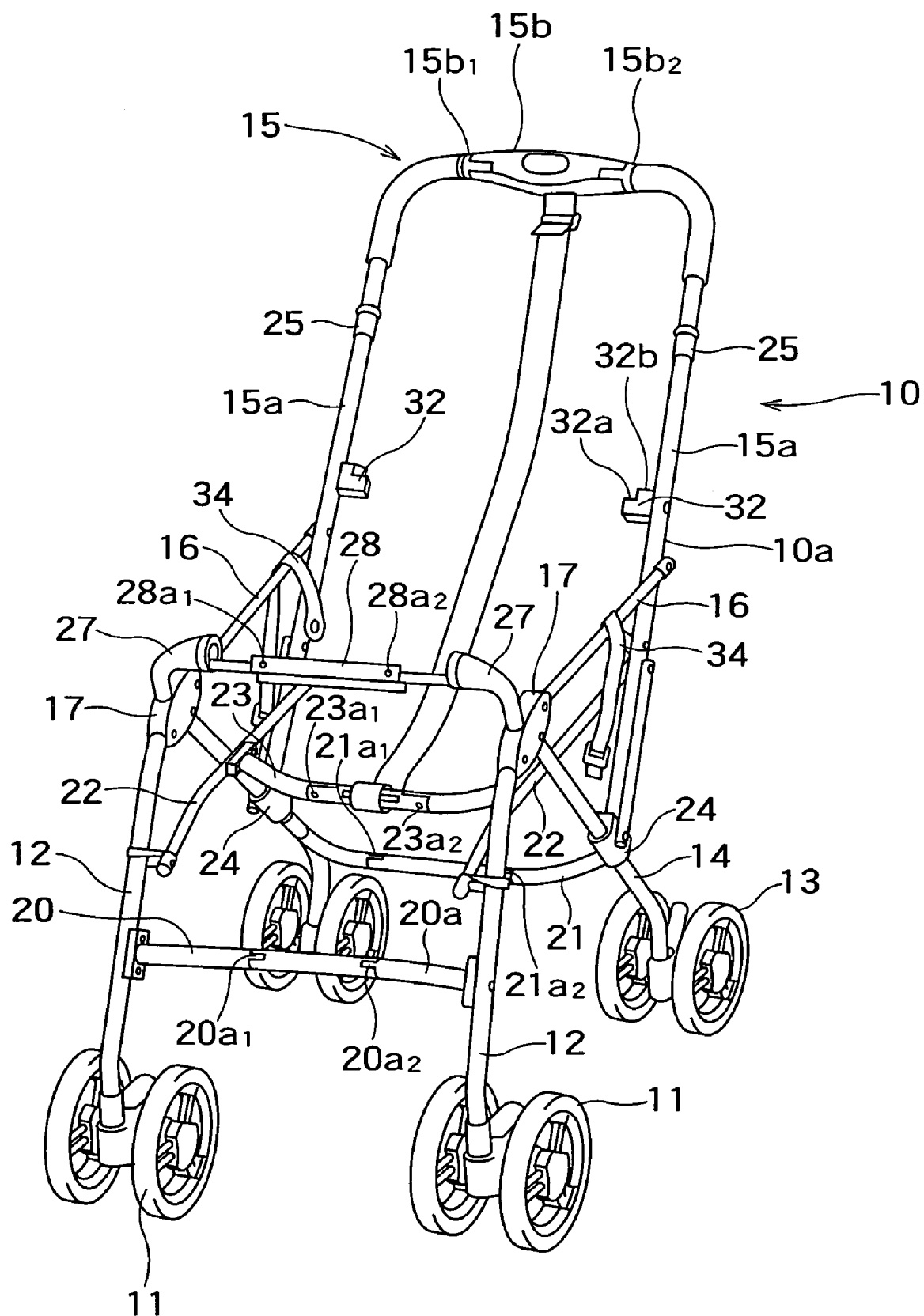
FIG. 1 is a schematic perspective view of a stroller in a preferred embodiment according to the present invention.
Figure 4:
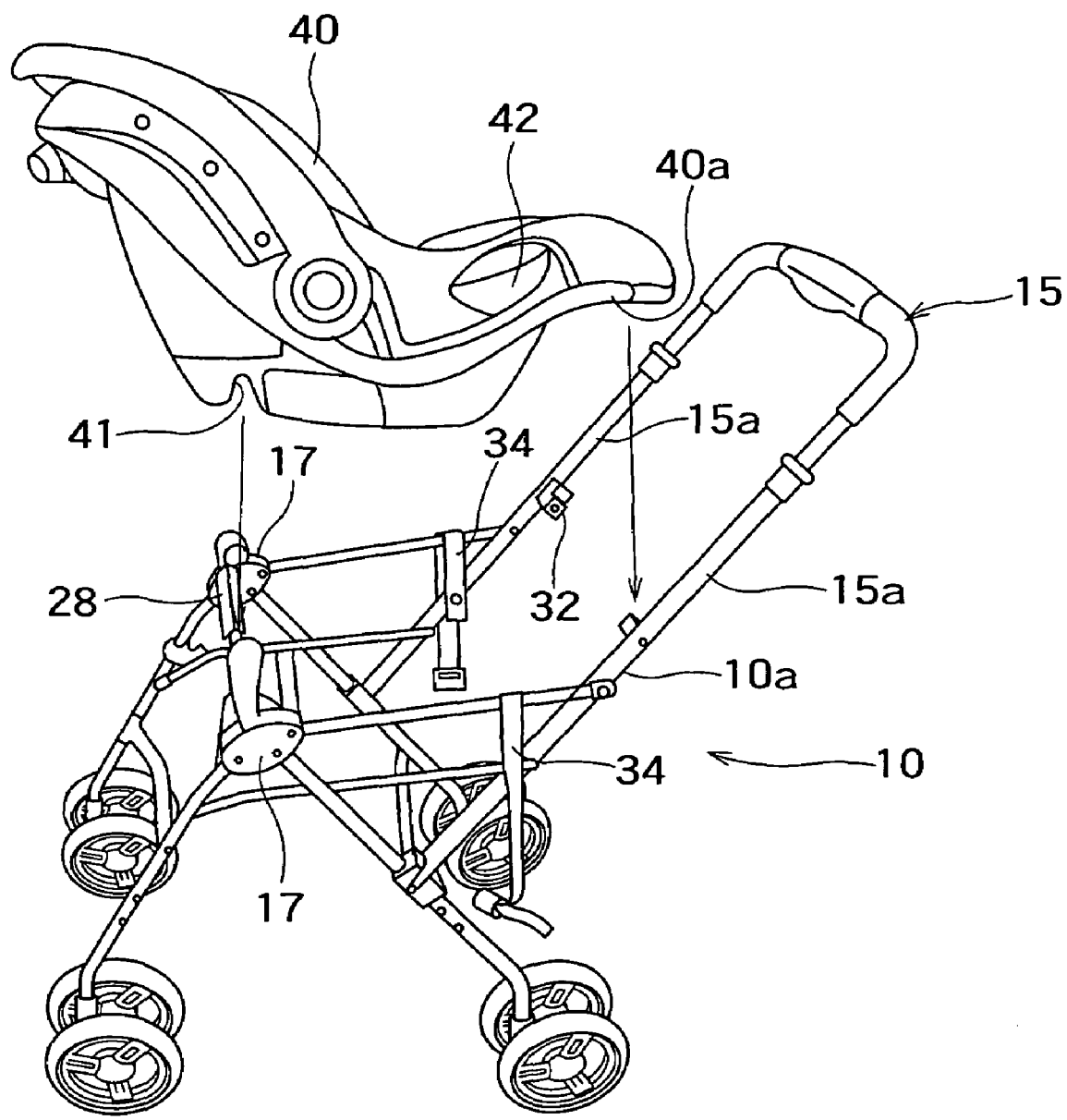
FIG. 4 is a schematic perspective view of assistance in explaining an operation for mounting a child car set to a body structure of the stroller.
Figure 5:
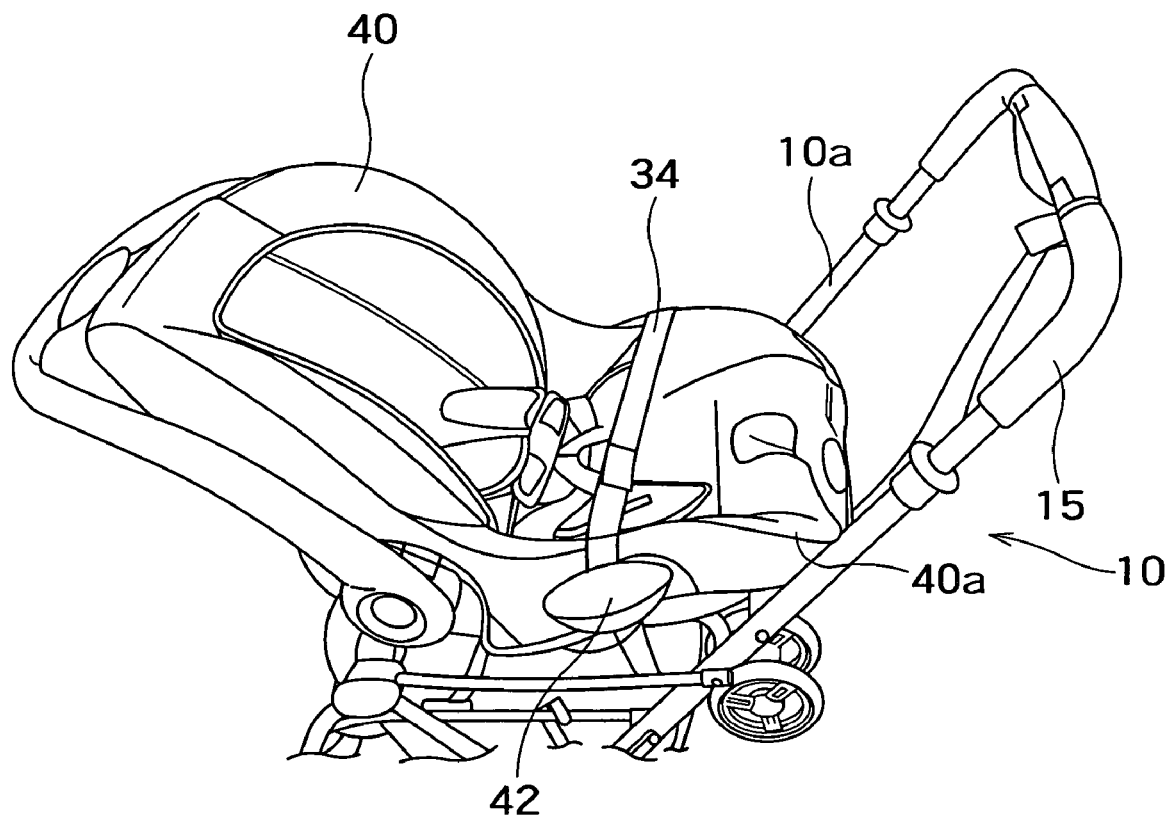
FIG. 5 is a perspective view of the body structure of the stroller and a child car set mounted to the body structure.

FIG. 1 shows a stroller 10 in a preferred embodiment according to the present invention in a schematic perspective view. Referring to FIGS. 1, 4 and 5, the stroller 10 includes a body structure 10a, and a child car set 40 having a groove engagement part 41, and opposite front side parts 40a. The child car set 40 can be detachably mounted on the body structure 10a.

The body structure 10a has right and left front legs 12 supporting front wheels 11, right and left rear legs 14 supporting rear wheels 13, a substantially U-shaped handle 15, and right and left armrests 16.

Base end parts of the armrests 16 are pivotally connected to straight parts 15a of the handle 15. Connecting members 17 are fixed to front end parts of the armrests 16. The respective upper ends of the front legs 12 and the rear legs 14 are pivotally connected to the connecting members 17. The right and the left front leg 12 are connected by a front connecting bar 20. The right and the left rear leg 14 are connected by a rear connecting bar 21. Each of side connecting bars 22 has a front end pivotally connected to a middle part of each front leg 12 and a rear end pivotally connected to the straight part 15a of the handle 15. The right and the left side connecting bar 22 are connected by an upper connecting bar 23. As mentioned above, the body structure 10a of the stroller 10 includes the front legs 12, the rear legs 14, the armrest bars 16 and the connecting bars connecting those members.

Catching members 24 are attached to middle parts of the rear legs 14, respectively. When the stroller 10 is unfolded for use as shown in FIG. 1, locking members, not shown, attached to end parts of the straight parts 15a of the handle 15 engage with the catching members 24 to hold the body structure 10a of the stroller 10 in the unfolded state. The locking members are slidably put on the straight parts 15a. The locking members are operated for vertical sliding along the straight parts 15a by operating devices 25 placed on the straight parts 15a, respectively.

When the locking members and the catching members 24 are engaged as shown in FIG. 1, the catching members 24 lock the rear legs 14 and the straight parts 15a of the handle 15 together to hold the body structure 10a in the unfolded state for use. When the locking members are moved upward by the operating devices 25, the locking members are disengaged from the catching members 24. Consequently, the body structure 10a can be folded in two by turning the armrest bars 16, the front legs 12, the rear legs 14 upward to facilitate carrying the stroller 10.

The U-shaped handle 15 has a gripping part 15b. The gripping part 15b, the front connecting bar 20, the rear connecting bar 21 and the upper connecting bar 23 are provided with two joints $15b_1$ and $15b_2$, two joints $20a_1$ and $20a_2$, two joints $21a_1$ and $21a_2$, and two joints $23a_1$ and $23a_2$ in middle parts thereof, respectively. The gripping part 15b, the front connecting bar 20, the rear connecting bar 21 and the upper connecting bar 23 can be bent at those joints to fold the body structure 10a. In a state where the body structure 10a is folded so that the front legs 12 and the rear legs 14 extend parallel to each other, the respective axes of the joints $15b_1$, $20a_1$, $21a_1$ and $23a_1$ are aligned and the respective axes of the joints $15b_2$, $20a_2$, $21a_2$ and $23a_2$ are aligned.

As mentioned above, the stroller 10 can be compactly folded in three in a U-shape in a plane by turning forward outer parts of the handle 15 on the outer side of the gripping part 15b to turn the respective outer parts of the handle 15, the front connecting bar 20, the rear connecting bar 21 and the upper connecting bar 23 on the joints after folding the front legs 12 and the rear legs 14 so that the front legs 12 and the rear legs 14 extend parallel to each other.

L-shaped support frame holding members 27 jut out respectively from the connecting members 17. A support frame 28 for supporting the child car set 40 is connected to the support frame holding members 27. Joints $28a_1$ and $28a_2$ are placed at two positions in a middle part of the support frame 28, respectively. When the stroller 10 is compactly folded in three, the support frame 28 is folded in three at the $28a_1$ and $28a_2$ to enable the body structure 10a to be folded in three.

Figure 2:
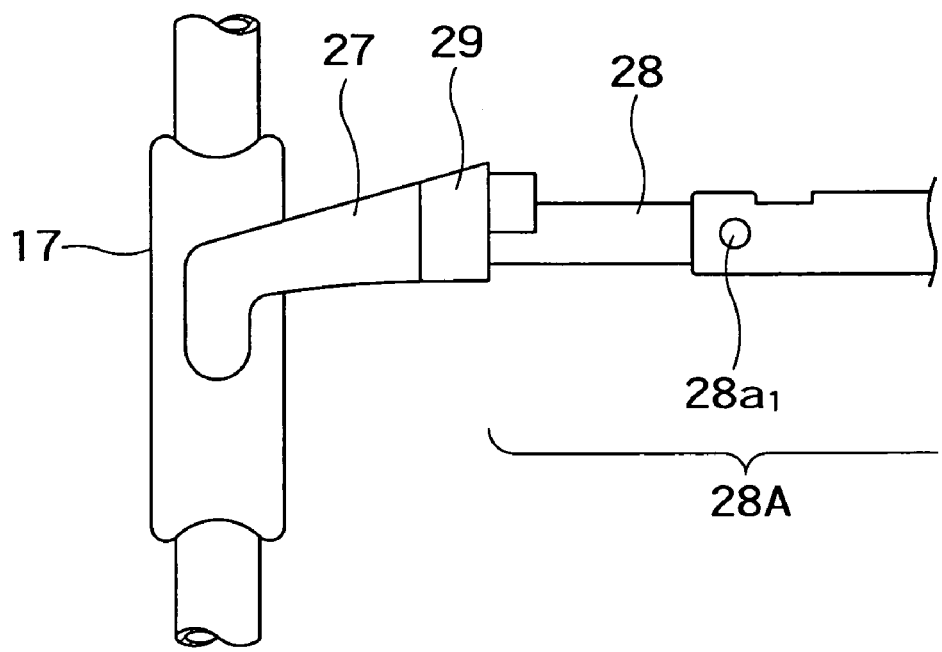
FIG. 2 is an enlarged view of a connecting member to which a support frame for supporting a child car set is attached.
Figure 3:
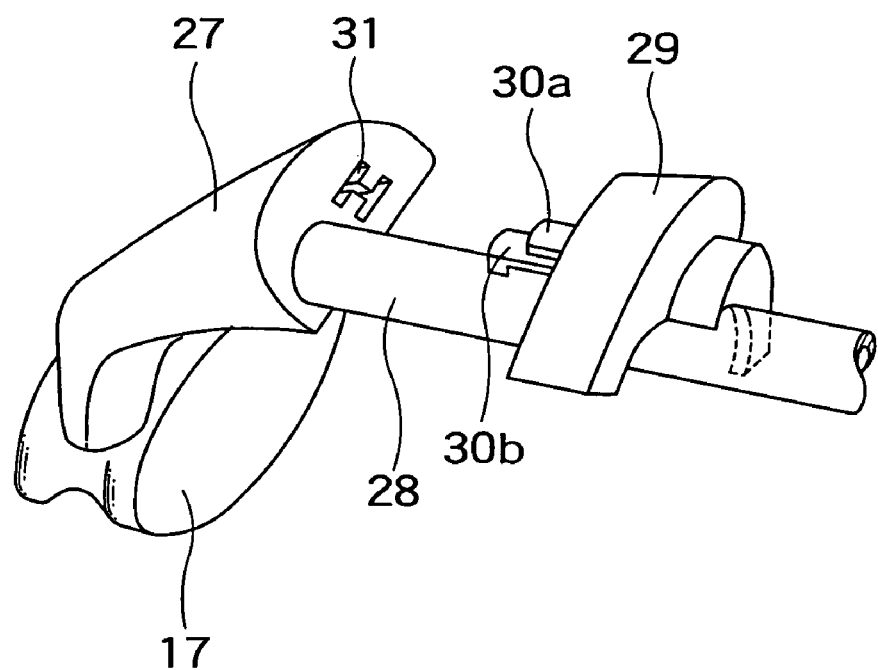
FIG. 3 is a perspective view of an end cap and a support frame holding member disengaged from the end cap.

Referring to FIG. 2 showing one of the opposite end parts of the support frame 28 in an enlarged view, an end cap 29 for adjusting the lateral dimension of a support section 28A of the support frame 28 is detachably attached to the end part of the support frame 28. The respective end surfaces of the support frame holding member 27 and the end cap 29 facing each other are provided with mating protrusions and recesses capable of being engaged by axially moving the end cap 29 on the support frame 28. More specifically, a guide part 30a and a catching part 30b projects from the end surface, facing the end surface of the support frame holding member 27, of the end cap 29 as shown in FIG. 3. As shown in FIG. 3, a recess 31 complementary to the guide parts 30a and the catching part 30b is formed in the end surface, facing the end cap 29, of the support frame holding member 27. The guide part 30a and the catching part 30b form the protrusions 30a, 30b.

The end cap 29 put on one end part of the support frame 28 is slid axially on the support frame 28 so that the guide part 30a and the catching part 30b are engaged in the recess 31 to join the end cap 29 fixedly to the support frame holding member 27 as shown in FIG. 2.

Brackets 32 for supporting opposite front, side parts of the child car set 40 are fixed to the straight parts 15a of the handle 15. Each of the brackets 32 has at least two steps 32a and 32b formed respectively at different levels. Front side parts of the child car set 40 are supported on the brackets 32. Seat fastening belts 34 for fastening the child car set 40 to the body structure 10a are attached to the straight parts 15a of the handle 15 of the body structure 10a.

As shown in FIG. 4, the child car set 40 is provided with the lateral groove 41 in the bottom surface of a rear part thereof. To mount the child car set 40 on the body structure 10a of the stroller 10, the child car set 40 is lowered from above the unfolded body structure 10a as shown in FIG. 4 so that the support frame 28 is engaged in the groove 41 of the child car set 40 and the front side parts 40a of the child car set 40 are seated on the lower steps 32a of the brackets 32 attached to the straight parts 15a of the handle 15, respectively. The support part 28A, extending between the end caps 29, of the support frame 28 is engaged in the groove 41. Thus the child car set 40 is restrained from lateral movement by the end caps 29 mounted on the support frame 28. Thus the child car set 40 is supported in a proper angular position on the body structure 10a with the front side parts 40a seated on the lower steps 32a of the brackets 32, respectively. Then, the seat fastening belts 34 passed through belt carriers 42 of the childe seat 40 are fastened to fasten the child car set 40 in place. FIG. 5 shows the child car set 40 mounted on the body structure 10a.

If the child car set 40 is large, the end caps 29 are moved axially on the support frame 28 to extract the guide parts 30a and the catching parts 30b of the end caps 29 from the recesses 31 of the support frame holding members 27 and the end caps 29 are removed from the support frame 28 to increase the length of the support part 28A. Then, the support part 28A having the thus increased length is engaged in the groove 41 of the child car set 40 and the front side parts 40a of the child car set 40 are seated on the upper steps 32b of the brackets 32 fixed to the straight parts 15a of the handle 15. Thus the length of the support part 28A of the support frame 28 can be adjusted by putting the end caps 29 on or removing the same from the support frame 28 according to the shape of the child car set 40. Therefore, the child car set 40 can be surely mounted on the body structure 10a.

The invention claimed is:

1. A stroller comprising: a body structure; and a child car set having a engagement part and opposite front side parts and capable of detachably mounted on the body structure;
    wherein the body structure has a handle having a pair of straight parts and a shape resembling the inverted letter U, armrest bars having base end parts respectively connected to the straight parts, connecting members respectively attached to front end parts of the armrest bars, and a support frame having opposite ends respectively connected to the connecting members and capable of engaging with the engagement part of the child car set, and
    end caps detachably put on or removed from opposite end parts of the support frame, respectively, depending on the shape of the child car set.

2. The stroller according to claim 1, wherein
    brackets for supporting the front side parts of the child car set thereon are attached to the straight parts of the handle.

3. The stroller according to claim 2, wherein
    each of the brackets has at least two steps formed respectively at different levels.

4. The stroller according to claim 1, wherein
the support frame is connected to the pair of connecting members through L-shaped support frame holding members, respectively.

5. The stroller according to claim 4, wherein
the end caps are able to slide along the support frame, the end caps have connecting protrusions, respectively, and the L-shaped support frame holding members are provided with recesses in which the connecting parts of the end caps are engaged, respectively.

6. The stroller according to claim 5, wherein the connecting protrusion of each of the end caps has a guide part that slides on the support frame, and a catching part on the outer side of the guide part.

7. The stroller according to claim 1, wherein
a pair of hinges are incorporated into a middle part of the support frame, and
the support frame is bent at the pair of hinges to enable the body structure to be folded in three.

* * * * *